United States Patent [19]

Simoni

[11] 4,153,960
[45] May 15, 1979

[54] BEEHIVE

[76] Inventor: Donald J. Simoni, 177 Pixley St., San Francisco, Calif. 94123

[21] Appl. No.: 846,090

[22] Filed: Oct. 27, 1977

Related U.S. Application Data

[63] Continuation-in-part of Ser. No. 731,964, Oct. 13, 1976, Pat. No. 4,094,026.

[51] Int. Cl.$^2$ ..................... A01K 47/00; A01K 47/06
[52] U.S. Cl. ................................................. 6/1; 6/4 B
[58] Field of Search ............... 6/1, 4 R, 4 B, 11, 12 M

[56] References Cited

U.S. PATENT DOCUMENTS

| | | | |
|---|---|---|---|
| 3,088,134 | 5/1963 | Abel | 6/1 |
| 3,995,338 | 12/1976 | Kauffeld | 6/4 R |

*Primary Examiner*—Hugh R. Chamblee
*Attorney, Agent, or Firm*—Townsend and Townsend

[57] ABSTRACT

An indoor observation beehive is disclosed which comprises an enclosed brood chamber and at least one enclosed honey chamber which can be isolated from the brood chamber. Two gated passageways are provided between the brood chamber and each honey chamber, and a queen excluder is mounted across one of the passageways in order to restrict the queen bee to the brood chamber. The gate in the second passageway is formed by a one way bee trap or escape leading from the honey chamber to the brood chamber. Several embodiments of the bee escape are described. In one embodiment, the escape comprises a tube with a bee entrance, a bee exit, and a pair of convergent flexible reeds or blades connected to a backing plate which serves also as a gate to cover the bee entrance. Small holes are provided in the side of the passageway which align with slots in the enclosure for the bee escape which permit a rod to be inserted into the bee passage at selected locations. In a second embodiment, the blades are attached to side walls of a fixed enclosure covering the bee exit and bee entrance. A slot is provided which is aligned with the reeds or blades and the passageway which extends at least from the bee entrance to the tip of the blades. In the first embodiment, the blades are translated relative to a fixed rod. In the second embodiment, the rod is translated along the slot while the blades remain fixed. With a rod inserted into the enclosure, the blades and the passageways can be cleaned of polypropolis and of old and weak bees. In this manner, bees can be evacuated from the honey chamber through the one way bee trap so that the honey chamber can be open and honey can be removed without exposure to bees.

3 Claims, 8 Drawing Figures

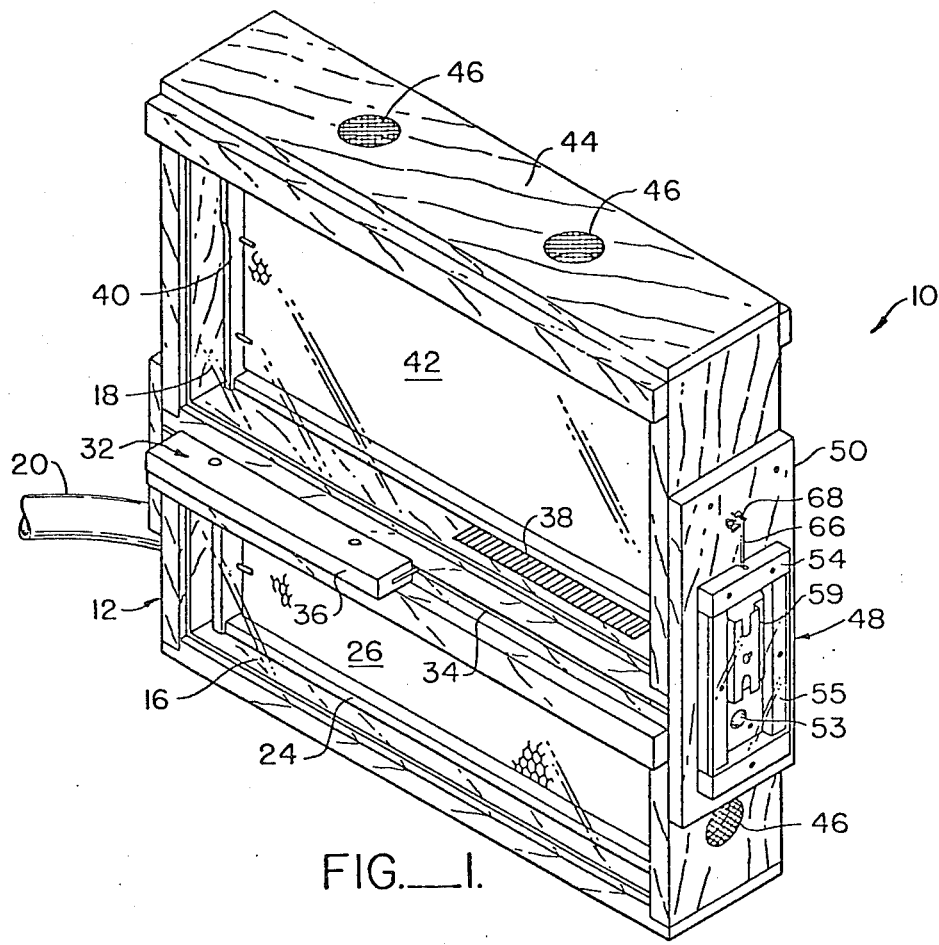
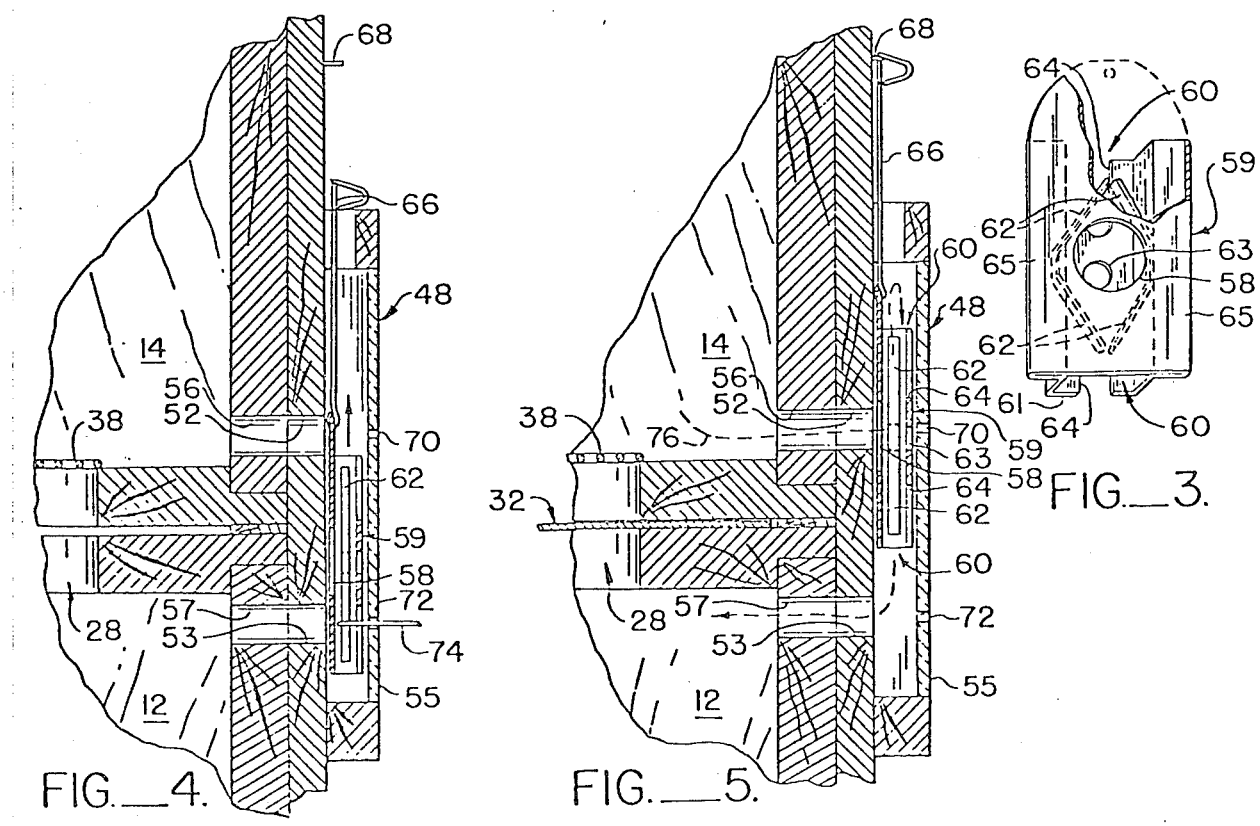

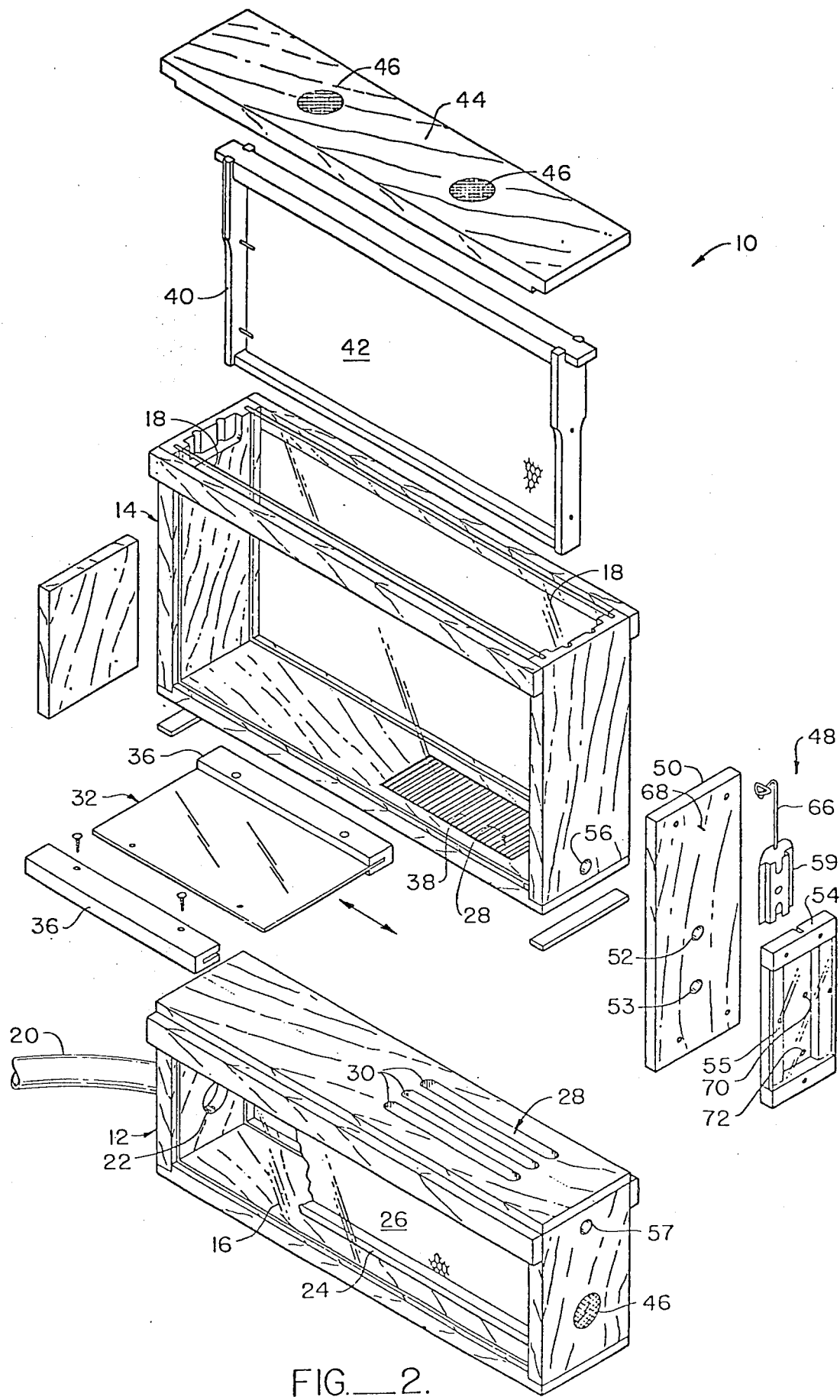
FIG._2.

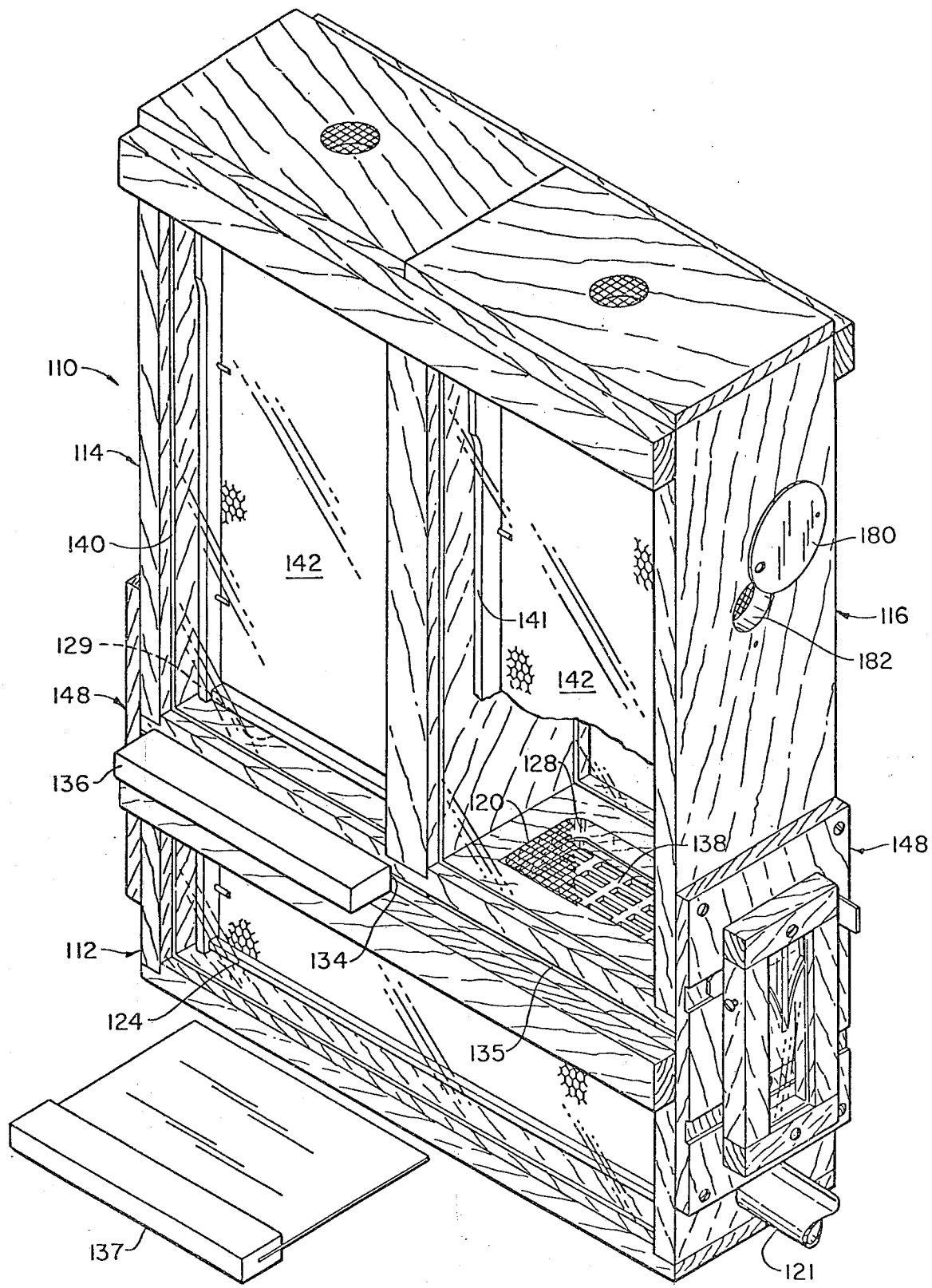
FIG._6.

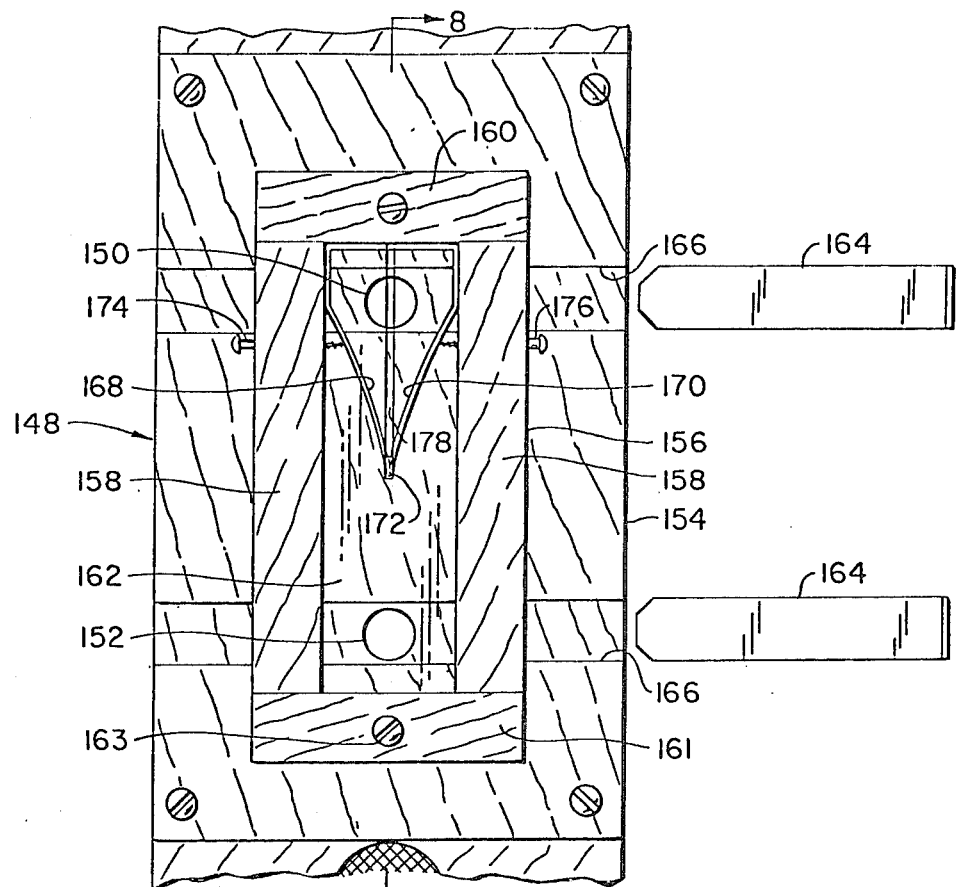
FIG._7.
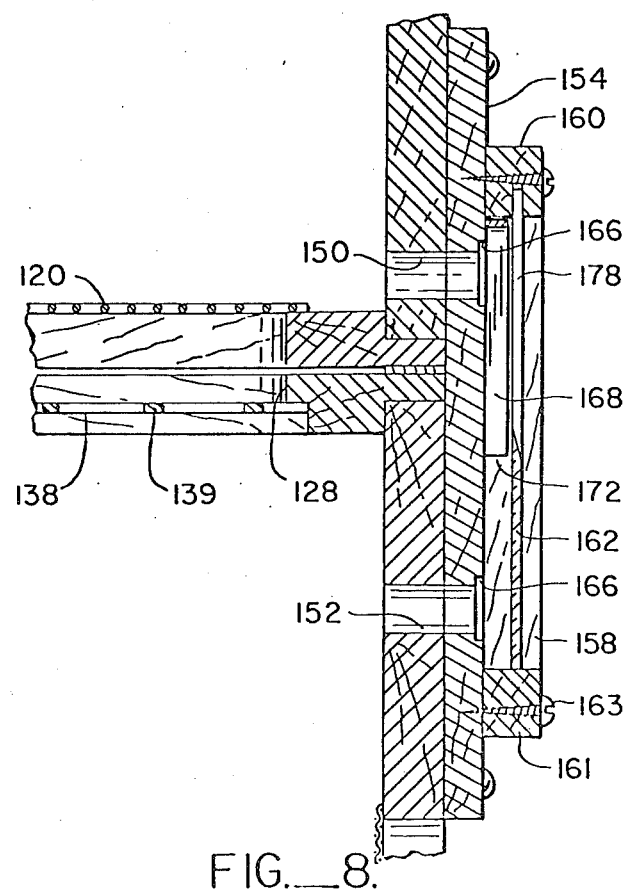
FIG._8.

BEEHIVE

BACKGROUND OF THE INVENTION

This application is a continuation-in-part of prior co-pending application Ser. No. 731,964 filed Oct. 13, 1976, now U.S. Pat. No. 4,094,026. This invention relates to an indoor observation beehive and particularly to an observation hive from which honey can be harvested without releasing bees from the hive.

Honey bees are among the most fascinating and useful insects. One of the best ways to study the habits of bees is in an observation hive. An observation hive is typically a box with a generally vertical observation window or windows providing a view of the colony. Observation hives are generally constructed only to observe the bee life cycle. It is difficult to maintain a permanent colony in an observation hive since observation hives are seldom constructed to prevent swarming. Moreover, it is difficult to harvest honey from any hive, including from an observation hive, without upsetting the bees or without exposing oneself to the bees.

A beehive especially adapted for harvesting honey is generally divided into two chambers, a brood chamber and a honey chamber, generally called a super, joined by a single passageway. In a typical hive, a queen bee lays eggs in the brood chamber and worker bees collect and deposit surplus honey in the super. For this purpose at least one frame is mounted in each chamber, each of which supports a foundation on which a comb may be built for containing the cells in which the brood is hatched or honey stored.

In an observation hive, it is generally not possible to utilize relatively sophisticated procedures of expanding the hive to cultivate a stable, permanent colony. Therefore, stability must be maintained by other means. If, for example, the brood chamber is much larger than the honey super, the hive will rapidly overpopulate, and as a result of overpopulation, the bees will swarm. Although swarming is not a particularly dangerous phenomenon, the sight of menacing looking bees can be frightening. Furthermore, swarming is a threat to the survival of the colony, since as much as 95% of the bees may be lost from the hive. Therefore, to promote maximum production of surplus honey, it is desirable to prevent swarming.

Honey bees generate a substance known as bee glue or polypropolis, which is used by the bees to fill up cracks and seal openings in the hive. Bees particularly tend to fill in any area of the hive which is not spaced within a tolerance known as bee space. A bee space may vary from 3/16 to ⅜ of an inch. Bee space is the area through which a bee may freely pass. If any area is smaller than bee space, the bees cannot get through and will therefore seal up the space. If the space on the other hand is greater than bee space, the bees will bridge it with cross combs or burr combs.

In the past, in order to harvest honey, it has been necessary to occasionally open and disassemble the hive and to clean away the polypropolis and burr combs, particularly around entrances and passageways. Bees are generally gentle except when aroused or when the hive is threatened. Prior art beehive designs have made it difficult to harvest honey or to service the hive without exposing the beekeeper to bees in the hive. Bees can be driven from the hive for short periods by smoking or fuming the hive. However, frequent smoking of the hive or the use of a fume board can be dangerous practice because it tends to upset the bees, causing them thereafter to become quite mean. Moreover, there is still the danger of exposure to bees according to both methods.

As a result of these combined problems, there is no known observation hive for containing a relatively permanent colony of bees from which honey can be readily and simply harvested, and which can also be cleaned and maintained without unnecessarily upsetting the bees in the colony.

SUMMARY OF THE INVENTION

According to the invention, an indoor observation beehive is disclosed which comprises an enclosed brood chamber and at least one enclosed honey chamber which can be isolated from the brood chamber. Two gated passageways are provided between the brood chamber and each honey chamber, and a queen excluder is mounted across one of the passageways in order to restrict the queen bee to the brood chamber. The gate in the second passageway is formed by a one way bee trap or escape leading from the honey chamber to the brood chamber. Several embodiments of the bee escape are described. In one embodiment, the escape comprises a tube with a bee entrance, a bee exit, and a pair of convergent flexible reeds or blades connected to a backing plate which serves also as a gate to cover the bee entrance. Small holes are provided in the side of the passageway which align with slots in the enclosure for the bee escape which permit a rod to be inserted into the bee passage at selected locations. In a second embodiment, the blades are attached to side walls of a fixed enclosure covering the bee exit and bee entrance. A slot is provided which is aligned with the reeds or blades and the passageway which extends at least from the bee entrance to the tip of the blades. In the first embodiment, the blades are translated relative to a a fixed rod. In the second embodiment, the rod is translated along the slot while the blades remain fixed. With a rod inserted into the enclosure, the blades and the passageways can be cleaned of polypropolis and of old and weak bees. In this manner, bees can be evacuated from the honey chamber through the one way bee trap so that the honey chamber can be open and honey can be removed without exposure to bees. In addition, in one embodiment, screw-type adjustments are provided which control the tension of the blades and the width of the separation at the convergence of the blades. In a further embodiment, the bottom of the one way passage can be removed to extract dead bees.

In a still further embodiment, respective honey chambers are provided with a double screen. The first screen, adjacent the brood chamber, serves as a queen excluder. It is comprised of a grid having perforations therethrough of regular and well defined length and width. In its best mode, the grid is plastic and is free of flashings around the perforations. The second screen is disposed at the opening of the main passage in the honey chamber. The second screen comprises a number five mesh screen. The second screen serves as a cleaning screen to prevent pollen and the like from being carried into the honey chamber by the worker bees. Use of this second screen is found to improve honey capacity and to reduce the mixing of pollen into honey which promotes production of lighter colored honey.

Access to the beehive may be provided through a plastic tube or other passage from the brood chamber to a window or outer wall, if the observation hive is used indoors. The free space in the hive, especially around the entrances, exits and passageway, is established within the so-called "bee space" to minimize the tendency of the bees to construct blocking structure therein. In order to inhibit excessive swarming due to overpopulation in the hive, and also to promote a relatively stable permanent colony, the ratio of the area of each of the honey chambers to the area of the brood chamber is selected to be on the order of between 1.5 and 3 to 1.

Honey is harvested by closing the main passage and opening the auxiliary or one way passage between the honey chamber and the brood chamber and then waiting a period of time to allow the bees to naturally migrate from the honey chamber to the brood chamber where the queen bee is located. The evacuation can be speeded by placement of lighted incense or other smoke producing substances or an irritating fumigant at air inlets to the honey chamber or chambers. Thereafter honey can be harvested from the evacuated and isolated honey chambers without exposure to the bees.

Two honey chambers used in conjunction with one brood chamber allows for one honey chamber to be largely dormant during the production time of the other honey chamber, and it also allows the beekeeper to regulate the size of his colony and its production rate so as to minimize the possibility of swarming due to overpopulation in the hive.

An object of this invention is to provide an observation beehive from which honey can be readily harvested.

A further object of the invention is to provide a beehive from which honey can be harvested without exposure to the bees.

A still further object of the invention is to provide a observation beehive suitable to maintain a stable, semipermanent colony.

A specific object of the invention is to provide a observation beehive which is suitable for mounting and display within the home. A further specific object of the invention is to provide an observation beehive which requires a minimum of cleaning and which can be readily cleaned if needed without exposure to bees.

A still further object of the invention is to provide means within the beehive to encourage relatively rapid evacuation of the bees from one chamber to another.

A still further object of the invention is to provide means within the passageways between chambers to free bees trapped therein without exposure to the bees.

These and other objects of the invention will be best understood by reference to the following detailed description taken in conjunction with the accompanying drawings.

BRIEF DESCRIPTION OF THE DRAWINGS

FIG. 1 is an isometric view of one embodiment of an observation beehive according to the present invention;

FIG. 2 is an exploded view in partial cutaway of the beehive of FIG. 1.;

FIG. 3 is a perspective view in partial cutaway of the bee escape according to one embodiment of the invention;

FIG. 4 illustrates passageways in the beehive with gates in a first position;

FIG. 5 illustrates passageways in the beehive with gates in a second position;

FIG. 6 is an isometric view of a second embodiment of an observation beehive according to the invention;

FIG. 7 is a vertical plan view of the second embodiment of a bee escape according to the invention; and FIG. 8 is a cross-sectional view along line 8—8 of FIG. 7.

DETAILED DESCRIPTION OF PREFERRED EMBODIMENTS

Referring to FIGS. 1 and 2, an observation beehive 10 is illustrated comprising a first or brood chamber 12, a second chamber or super 14, each with transparent viewing windows 16 and 18. The windows 16 and 18 may be plastic or glass, and the observation beehive 10 can be mounted indoors. A tube 20 opening into the brood chamber 12 through an entrance 22 can extend through a wall or a window to the out-of-doors to provide ingress and egress for the bees.

The brood chamber 12 contains a frame 24 upon which is mounted a wax brood foundation 26 wherein the workers can build a comb and the queen bee can lay her eggs. The frame 24 and foundation 26 with the comb construction are spaced between 3/16 and ⅜ of an inch from the sides and end walls to provide the proper spacing for free movement of the bees, or the so-called bee space.

As shown most clearly in FIG. 2, a first passageway 28 is provided between brood chamber 12 and super 14. Passageway 28 comprises a plurality of long slots 30, each having a width corresponding to the bee space. The slots 30 may be relatively long so that a maximum number of worker bees can pass through freely in either direction, notwithstanding the relatively restrictive bee space.

A knife gate 32 is slidably mounted between brood chamber 12 and super 14 along a slot 34 through the passageway 28. The knife gate 32 may be a sheet of metal with one or more handles 36 on the sides so that the gate 32 can be gripped and slid conveniently along the track 34. As a further convenience, at least one handle 36 can be removed, as shown in FIG. 2, so that the gate 32 can be withdrawn from between brood chamber 12 and super 14 for cleaning or when no gate is needed. A knife gate of this design is preferred since bees are less likely to block it with polypropolis to render it nonfunctional.

In order to prevent the queen bee from entering into the super 14, a queen excluder 38 is mounted in the path of passageway 28. The queen excluder 38 is a wire grid through which the queen bee and drone bees cannot pass. The excluder 38 thereby assures that no eggs are layed in super 14. The queen excluder 38 is preferably mounted on the super side of gate 32 above the passageway 28 so that it can be accessed or removed for occasional cleaning, as necessary. In addition, the space under the excluder 38 adjacent passageway 28 is hollowed out so that the bees can have full access to the excluder grid.

Within the super 14 is mounted a removable frame 40 supporting a wax foundation 42. Super 14 includes a top 44 which is removable to permit access to the honey frame 40, as necessary for harvesting. Screened holes 46 are provided in both the top 44 and in the sides of brood chamber 12 for ventilation.

One way to minimize the likelihood of swarming is to limit the size of the brood chamber 12 relative to the super 14 so that the colony does not overpopulate. In particular, it has been found that the honey super 14 should be between two and three times the size of the brood chamber 12, and preferably about two and one half times the size of the brood chamber 12 in order to produce maximum population stability while providing adequate honey surplus production.

An important feature of the invention is a second passageway 48 providing an alternate bee path between super 14 and brood chamber 12. Unlike first passageway 28, second passageway 48 constrains the bees to move only from super 14 into brood chamber 12.

The second passageway 48 comprises a path formed by a sideboard 50 bridging the adjacent side walls of the super 14 at brood chamber 12, with bee space sized orifices 52 and 53 therethrough which mate with bee space sized orifices 56 and 57 through the side walls of the super 14 and brood chamber 12, respectively, and which are separated by a gated one way cavity. In particular, mounted onto the sideboard 50 is a shallow hollow box 54 with an observation window 55 on the broad external side forming the cavity. Within the cavity by the sideboard 50, the box 54 and the viewing window 55 is mounted a one way bee escape 59 also forming the gate. The bee escape 59 may be a modified version of the standard bee escape available from beekeeper suppliers such as the A. I. Root Co. of Council Bluffs, Iowa, or it may be embodied in other forms incorporating similar operating principles.

As shown in cutaway in FIG. 3, the preferred bee escape 59 comprises a generally flat rectangular cross-section tube 61 having a bee entrance opening 58 in the side of the tube, and exit openings 60 at each end of the tube. The entrance opening 58 is preferably in the back wall of the bee escape tube 61. Opposite the entrance opening 58 in the front wall is a port 63 which is generally smaller than entrance opening 58. The distance between the front and back walls of tube 61 is selected to correspond to the thickness of box 54 so that the port 63 is always covered by the transparent window 55 so the bees cannot pass through the port 53. The bee escape 59 further includes lateral flanges 65 which protrude from the sides of tube 61 to maintain the passages in the box 54 along with the sides of tube 61 corresponding to bee space.

Between the entrance opening 58 and each exit opening 60 there is a pair of flexible reeds 62 which converge toward each exit opening 60 to form the one way bee gate. In the side of the tube 61 over each of the convergent reeds 62, a thin longitudinal slot 64 is provided to allow access to the one way gate area.

The bee escape 59 is slidably mounted in the box 54 of passageway 48 with the entrance opening 58 confronting the sideboard 50. The entrance opening 58 can be lined up with orifice 52. The bee escape 59 can be affixed in either of two positions. In one position, the bee escape 56 may be hung by a hooked wire 66 from a nail 68 in the sideboard 50, aligning the entrance opening 58 with opening 52 as shown in FIG. 5. In another position, the bee escape 56 may hang near the bottom of box 54 on the hooked wire 66 so the back wall blocks both openings 52 and 53, as shown in FIG. 4.

FIG. 4 and FIG. 5 further illustrate particular features of the invention. As previously mentioned, bees are prone to block any opening which is not within the dimensions of the bee space (and in some cases even those within the bee escape 59 where the delicate reeds 62 converge. Therefore, the slots 64 in the bee escape 56 are provided in order to permit access to the convergent region of reeds 62 so the reeds 62 can be cleaned easily. Further in order to permit access to the slots 64, small holes 70 and 72 are provided through the window 55. The holes 70 and 72 are aligned with the orifices 52 and 53, respectively. The holes 70 and 72 permit the insertion of a cleaning rod 74, or the like, through the window 55 and into slots 64 of the bee escape 56. In addition, the rod 74 may be inserted through the passageway 48 into openings 52 and 53 for cleaning, as needed, without exposing oneself to the bees.

In addition, rod 74 may be used to free weal and old bees which may be caught in reeds 62 without opening the box 54. For example, to free a trapped bee, rod 74 may be inserted through the small holes 70 or 72 and into one of the slots 64 behind the bee so that the bee is between the rod 74 and exit opening 60. Holding the rod 74 in place, the bee escape is translated, for example, from the position of FIG. 4 to the position of FIG. 5, to urge the bee through the bee escape exit opening 60. Thus the honey super 14 can be completely evacuated without exposure to the bees.

The relative size of the honey super 14 and brood chamber 12 have an important effect on the stability of the hive. One way to minimize the likelihood of swarming is to limit the size of the brood chamber 12 relative to the super 14 so that the colony does not overpopulate. In particular, it has been found that the honey super 14 should be between two and three times the size of the brood chamber 12, and preferably about two and one-half times the size of the brood chamber 12 in order to produce maximum population stability while providing adequate honey surplus production.

In order to harvest honey from a hive, it is necessary to evacuate the super 14. Normally, the gate 32 is in the open position, as shown in FIG. 1, or removed from between brood chamber 12 and honey super 14. In addition, the gate of second passageway 48, namely the bee escape 59, is in the closed position of FIG. 4, blocking openings 52 and 53. To evacuate the bees from the super 14, the gate 32 is slid to block the first passageway 28, and the alternate passage through second passageway 48 is opened by hooking wire 66 supporting bee escape 59 on nail 68. Bees in the honey super 14 will naturally migrate to the brood chamber 12 as indicated by arrow 76, since the worker bees tend naturally to migrate to the location of the queen bee constrained to the brood chamber 12. In addition, the bees in honey super 14 will be attracted to the light through port 63 in the bee escape 69, particularly if viewing windows 18 are covered. The bees are constrained from returning to the honey super 14 by the reeds 62 blocking the path. Following a normal course, bees will evacuate from the honey super 14 in less than 24 hours. Evacuation can be further speeded by the placement of a weak acid solution, such as vinegar, on or near the air vents 46 in top 44 so that the fumes permeate into the super 14. Bees trapped in bee escape 59 can be removed as had been described. Thereafter, top 44 may be removed and the honey-containing frame 42 can be withdrawn without any danger of exposure to bees.

Turning now to a further embodiment of the invention, there is shown in FIG. 6 an observation beehive 110 comprising a brood chamber 112, a first honey chamber 114, and a second honey chamber 116. Tube 121 provides access for bees into the brood chamber 112. First and second honey chambers 114 and 116 are symmetrically identical and are adapted to contain frames 140 and 141 supporting wax foundations 142. Knife gates 136 and 137 are laterally translatable and removable from slots 134, 135, respectively, between the brood chamber 112 and the honey chambers 116, 114. A main passageway 128, 129, is provided between each honey chamber 114, 116 and the brood chamber 112. Each main passageway 128, 129 is provided with two screens, 120, 139. Referring to FIG. 8, the screen wire mesh in the honey chamber side of the passageway 128 is a grid of number 5 mesh, which is just large enough to allow a worker bee through. The screen 139 is preferably a plastic, such as polyethylene or molded polyprophylene, molded to form longitudinal perforations 138 sufficiently narrow to prevent passage of a queen bee and drones therethrough.

The wire mesh serves as a mechanism for preventing the pollen on the bodies of the worker bees from passing into the honey chamber. The exclusion of pollen from the honey chamber increases honey production and promotes production of lighter honey by preventing mixing of pollen and honey.

At each end of the hive 110, along the end walls, there is provided an auxiliary passage 148 between the respective honey chambers 114, 116 and the brood chamber 112. Referring particularly to FIG. 7, each passageway 148 includes a bee entrance 150 and a bee exit 152 which are holes mating with corresponding holes in the brood chamber 112 and the adjacent end wall of the respective honey chambers 114, 116. The passageway 148 comprises a backing plate 154 and a hollow enclosure 156 which encompasses the bee entrance 150 and bee exit 152. The enclosure 156 includes two side walls 158 and upper and lower end walls 160, 161. In addition a transparent roof 162 is mounted between the confronting faces of side walls 158 and end walls 160, 161 (FIG. 8). Knife gates 164, slide laterally within slot 166 in backing plate 154 block and unblock the bee exit 152 and bee entrance 150.

Within the enclosure 156 and adjacent the bee entrance 150, there are provided two blades 168, 170. The blades are fastened to opposing portions of side walls 158. The free ends of the blades 168, 120 convergently extend to a narrow opening 172 in the direction of the exit 152 to the brood chamber. The blades 168, 170 are sufficiently flexible so that a bee of normal strength can press open the narrow passage 172 when the blades are properly adjusted.

In order to control the adjustment of the blades 168 and 170, two threaded screws 174, 176 (FIG. 7) are provided through the side walls 158, the tips of which engage the backs of the free portion of blade 168, 170 to urge the same toward one another. In this manner the size of opening 172, as well as the tension of the blades 168, 170 can be adjustably controlled. While screws 174, 176 are preferred, bolts or other translatable rods can, of course, also be used to adjust the blades 168, 170.

Through the face of transparent roof 162, there is provided a slot 178 which is longitudinally aligned between the bee entrance 150 and the narrow opening 172.

This slot 178 permits the insertion of a rod or other instrument for the purpose of cleaning out the passage 172 and for urging old or weak bees through the passage 172. The slot 178 is also very helpful in expediting the evacuation of the honey chamber so that the beekeeper is not exposed to bees during the harvest of the honey.

The invention has now been described with reference to specific embodiments. Two specific embodiments have been disclosed. Other embodiments will be apparent to persons having ordinary skill in the relevent art in like of the present disclosure. For example, in order to further expedite the evacuation of bees from a honey chamber, a hollow smoker cover 180 (FIG. 6) may be attached to or set upon an air hole 182. Incense or the like may be placed in the air hole 182 so as to allow smoke to permeate the honey chamber and flush out the bees. In addition, to allow the beekeeper to remove dead bees from passageway 148, lower end wall 161 may be removable. This is most easily accomplished by the provision of a screw 163 attaching the removable panel of end wall 161 to the backing plate 154. It is therefore not intended that the invention be limited except as indicated by the appended claims.

I claim:

1. In a beehive having a main passageway between a honey chamber and an abutting brood chamber, an alternative passage means comprising:
   a first orifice in an end wall of the honey chamber adjacent the brood chamber:
   a second orifice in the end wall of the brood chamber adjacent the honey chamber:
   a hollow enclosure having four side walls and a transparent roof jointly covering said first and second orifices:
   first and second slide gates disposed to block and unblock said first and second orifices from said enclosure:
   a pair of flexible blades attached to opposing side walls to define a one way route from said honey chamber to said brood chamber: and
   a narrow slot in said roof aligned and adjacent to said narrow opening for providing access by means of a thin instrument to urge bees through said narrow opening and to clean said narrow opening.

2. The apparatus of claim 1, further including at least one moveable pin disposed through said enclosure side wall to engage a free portion of at least one of said blades for controlling the width of said narrow opening and the tension of said at least one blade.

3. The apparatus of claim 1 wherein at least one side wall of said hollow enclosure is removable to permit the extraction of the bodies of dead bees within said hollow enclosure.

* * * * *